US007094449B2

(12) United States Patent
Boler, Jr.

(10) Patent No.: US 7,094,449 B2
(45) Date of Patent: Aug. 22, 2006

(54) DEVICE AND SYSTEM FOR COATING A SURFACE AND REDUCING SURFACE IRREGULARITIES

(76) Inventor: Lewyn B. Boler, Jr., 1000 E. Channel St., Stockton, CA (US) 95205

( * ) Notice: Subject to any disclaimer, the term of this patent is extended or adjusted under 35 U.S.C. 154(b) by 172 days.

(21) Appl. No.: 10/746,116

(22) Filed: Dec. 24, 2003

(65) Prior Publication Data

US 2004/0244682 A1 Dec. 9, 2004

Related U.S. Application Data

(63) Continuation-in-part of application No. PCT/US02/20031, filed on Jun. 21, 2002.

(51) Int. Cl.

| | |
|---|---|
| ***B05D 1/28*** | (2006.01) |
| ***B05C 17/00*** | (2006.01) |
| ***B08B 1/00*** | (2006.01) |
| ***B32B 5/18*** | (2006.01) |

(52) U.S. Cl. ...................... 427/429; 118/264; 118/265; 15/104.93; 428/447

(58) Field of Classification Search ..................... None
See application file for complete search history.

(56) References Cited

U.S. PATENT DOCUMENTS

| | | | |
|---|---|---|---|
| 4,404,035 | A | 9/1983 | Ona |
| 4,789,567 | A | 12/1988 | Freeman et al. |
| 4,968,538 | A | 11/1990 | Freeman et al. |
| 5,203,883 | A | 4/1993 | Perry |
| 5,475,890 | A | 12/1995 | Chen |
| 5,476,416 | A | 12/1995 | Kodate |
| 5,631,013 | A | 5/1997 | Bergmann et al. |
| 5,676,714 | A | 10/1997 | Kodate |
| 5,727,993 | A | 3/1998 | Kodate |
| 5,837,078 | A | 11/1998 | Lowe |
| 5,904,758 | A | 5/1999 | Kucala |
| 5,936,022 | A | 8/1999 | Freeman et al. |
| 5,969,078 | A | 10/1999 | Freeman et al. |
| 6,241,577 | B1 | 6/2001 | Shibata |

OTHER PUBLICATIONS

Advertisement: Paint Cleaning Clay and Speed Shine Lubricant and Clay Holding Pad, May 2003 or earlier, griotsgarage.com.

*Primary Examiner*—Michael J. Feely
(74) *Attorney, Agent, or Firm*—Ronald J. Ventola, II

(57) ABSTRACT

A system for applying a protective coating to a surface includes a device for applying a protective coating to a surface. The device includes a foam pad impregnated with a composite having a matrix that includes at least one polymer resin chosen from the following group: hydrocarbon, polybutene, silicone, polyethylene; at least one silicone fluid; at least one surface coating chosen from the following groups: wax, silicone resin; and a multiplicity of inert particles dispersed within the matrix. The composite, when examined alone (before it is impregnated into the foam pad), has a wax penetration point measurement from about 60 mm to about 250 mm at 25 degrees Celsius under ASTM Test Method D217, and the foam pad impregnated with the composite is adapted so that the foam pad impregnated with the composite, when rubbed upon a surface, leaves a surface coating on the surface. The invention also may take the form of a system that includes a foam pad impregnated with the composite and a rejuvenator fluid containing a silicone and a wax.

46 Claims, 4 Drawing Sheets

DEVICE AND SYSTEM FOR COATING A SURFACE AND REDUCING SURFACE IRREGULARITIES

CROSS-REFERENCE TO RELATED APPLICATIONS

This application is a continuation-in-part of applicant's PCT Application No. PCT/US02/20031, which was filed on Jun. 21, 2002.

COPYRIGHT STATEMENT

Not applicable.

FEDERAL RESEARCH STATEMENT

Not applicable.

DESCRIPTION

1. Technical Field

This invention relates to the field of applying lustrous protective coatings such as waxes and silicones to coated and uncoated surfaces such as metal, plastic, plexiglass®, formica®, lexan®, rubber, vinyl, leather, wood, marble, tile, glass, and fiberglass. This invention also relates to applying lustrous coatings to such a surface while reducing or eliminating irregularities that may be found on the surface or in the coating found on the surface. This invention also may be used for mold release in the field of molding items made from fiberglass, plastic, rubber, and other similar materials.

2. Background Art

Applicant's invention provides advantages over the prior art that predates applicant's PCT Application No. PCT/US02/20031. Applicant's invention also provides advantages over the devices disclosed in applicant's PCT Application No. PCT/US02/20031.

Coated and uncoated surfaces commonly are treated in a variety of ways to lengthen their useful life and to enhance their appearance. Often these surface-treatment methods include one or more of four processes: cleaning the surface, coating the surface, polishing the surface, and smoothing the surface. As used herein, "cleaning" refers to the removal of dirt through conventional washing with soap or detergent or by very gentle abrasive action. "Coating" refers to the application of one or more waxes, silicone resins, or similar coatings that adhere to the subject surface, protect the surface against damage, and help to prevent dirt and other deposits from sticking to the surface. "Polishing" refers to the use of abrasives to remove dirt and other deposits that cannot be removed by cleaning. Polishing optionally may be performed in preparation for coating. Finally, "smoothing" a surface refers to using mild abrasives to reduce the number or severity of surface imperfections and imperfections in the surface coating such a swirl marks or "spider webs."

Conventionally, abrasives and compounds containing abrasives have been used for polishing and smoothing surfaces. Abrasives have also been used in compounds and formulations for coating to help polish the surface while a coating is being applied. Many abrasives, whether they are used in polishing compounds, in smoothing compounds, or in coating compounds, may damage the surface.

The background art that is most relevant to applicant's invention is the art of coating compositions. Compositions for coating have been available for many years. Conventional coating compositions generally fall into two principal categories: (1) compositions containing volatile organic compounds (VOCs) and (2) compositions containing water. Conventional coating compositions have disadvantages related to the presence of substantial amounts of VOCs or water.

Some conventional coating compositions, sold as pastes or liquids, are dispersions containing abrasives, wax, and one or more VOCs, which are used as solvents to dissolve the wax, silicone resin, or similar coatings. VOCs may cause health problems and environmental problems. VOCs are thus heavily regulated by governments. Users of compounds containing VOCs may need to use special equipment to maintain safety or to comply with governmental regulations. For all these reasons, it is desirable to prepare compositions that are suitable for coating surfaces but that contain minimal or no VOCs—less than about 5 percent by weight. Non-VOC hydrocarbons, a substitute for VOCs, require careful handling because they burn readily and have low flash points.

Other conventional coating compositions are emulsions containing abrasives, wax, water, and a surfactant or emulsifier—commonly soap or detergent. These emulsions can be difficult to stabilize and commonly remain somewhat unstable, even when carefully formulated. High temperatures and low temperatures can cause these emulsions to "break" or separate into their component parts. Because these emulsions contain water, freezing can become an issue when they are processed, stored, or used at low temperatures. Therefore, it is desirable to provide a composition that is suitable for coating but contains little or no water—less than about 5 percent by weight.

Many conventional coating compounds are used by applying the compound to a surface, allowing the compound to dry by evaporation of the solvent, and then wiping the abrasive residue from the surface. The abrasive residue may create a health risk to the user. The vapors of the evaporating solvent may also pose a health risk to the user—especially if the solvent is a VOC. Users of compounds that require a drying process may be required to use additional equipment to protect themselves or to comply with governmental regulations. Therefore, it is desirable to produce coating compounds that contain abrasives but do not leave a dry abrasive residue upon the coated surface.

Finally, many conventional coating compounds contain soap or detergent. The presence of soap or detergent may hinder the coating process. Thus, it is desirable to produce compounds that are suitable for coating surfaces but contain minimal or no soap or detergent—less than about 10 percent by weight.

U.S. Pat. No. 4,404,035 to Ona, et al. discloses a homogeneous mixture of a wax and an organopolysiloxane. But like all conventional coating compositions, the composition disclosed in Ona contains VOCs or emulsifiers that the present invention does not require.

U.S. Pat. No. 5,837,058 to Lowe discloses a VOC-free coating composition, but the composition contains substantial amounts of water and thus is subject to the freezing and instability referred to above. Lowe does not disclose a plastic polishing tool, nor does Lowe assert that the compound is useful for cleaning or polishing a surface.

VOC-free hydrocarbon solvents have become available, but many of these solvents burn readily and have low flash points. These characteristics also require careful use to ensure safety.

The background art includes polishing tools that are made from flexible plastic materials with abrasive particles dispersed therein. These tools do not apply a protective coating to the surface being polished. For example, U.S. Pat. Nos. 5,476,416 and 5,727,993 to Kodate disclose polishing tools made from a plastic material having abrasives and synthetic detergent powder dispersed therein. U.S. Pat. No. 5,676,714 to Kodate discloses a similar tool that contains a soft plastic material, abrasive particles, and non-abrasive globular particles. Kodate's tools do not aid the user in coating the surface with a lustrous, protective wax or silicone coating. Kodate's tools require the user who wants to apply a lustrous coating to employ an additional process after using Kodate's tools to clean and polish the surface.

The background art includes a polishing clay that is described in an advertisement as having properties similar to those claimed for Kodate's plastic polishing tools. The advertisement, which discloses a pliable "clay" cleaning material, a sponge pad with an elastic band for use in handling the material, and a liquid lubricant (ingredients not specified) used with the pliable cleaning material. The advertisement discloses a material that is useful in cleaning a surface, but not in applying a coating to the surface. The material disclosed also requires the use of a liquid lubricant.

In the context of the disclosure of the instant invention, applicant will discuss the advantages of the instant invention over the devices disclosed in applicant's PCT Application No. PCT/US02/20031.

DISCLOSURE OF INVENTION

Objects of the Invention

It is an object of this invention to provide a device and a system comprising a foam pad partially or entirely impregnated with a composite for applying a lustrous, protective coating to a surface and for smoothing the surface.

It is another object of the invention to provide a device and a system for applying a lustrous, protective coating to a surface while reducing or eliminating the use of volatile organic compounds (VOCs), water, and emulsifiers, including detergent and soap.

It is another object of the invention to provide a system for applying a lustrous, protective coating to a surface, the system comprising a foam pad partially or entirely impregnated with a composite material for applying the coating and preferably further comprising a rejuvenator fluid to help maintain the properties of the composite as the system is used. Another object of the invention is to provide such a system in which the amount of the composite required is minimized and wherein the coating component of the composite may be rejuvenated by use of a rejuvenator fluid.

It is another object of the invention to provide a device and a system for applying a lustrous, protective coating to a surface while minimizing the formation of abrasive residue upon the coated surface.

It is another object of the invention to provide a device and a system for applying a lustrous, protective coating to a surface using a composite material while reducing the amount of composite material required for each device and reducing the amount of composite consumed in employing the system.

It is another object of the invention to provide a device and system for applying, to a metal mold, a non-corrosive, dry-film, anti-stick layer that improves the release of molded plastic, fiberglass, and rubber parts.

Disclosure: Invention in General

To achieve these and other advantages and objects, and in accordance with the purposes of the invention as embodied and broadly described herein, in one aspect the inventor describes a system comprising a foam pad partially or entirely impregnated with a composite material comprising a flexible plastic matrix; one or more silicone fluids; a surface coating containing one or more substances chosen from either or both of the following groups: waxes and silicones; and a multiplicity of one or more types of inert particles, preferably silica sand and aluminum silicate. The invention may take the form of a system further comprising a rejuvenator fluid for maintaining the properties of the composite during use.

The composite is adapted so that it (when examined alone, not when impregnated into the foam pad) has a wax penetration point measurement from about 60 mm to about 250 mm at 25 degrees Celsius under ASTM Test Method D217-82 (ASTM Committee D-2 on Petroleum Products and Lubricants and IP Standardization Committee, Subcommittee D02.0 on Lubricating Grease, approved Aug. 27, 1982, originally published October 1982, edited October 1983; the cited method appears in 1984 *Annual Book of ASTM Standards*; this is the version of the test method referred to throughout this application).

The foam pad impregnated with the composite and the composite are adapted so that, when the composite-impregnated portion of the foam pad is rubbed upon a surface, the surface coating is deposited upon the surface and the surface is smoothed.

Applicant's invention provides a lustrous surface coating to a surface. Applicant's invention comprises a foam pad impregnated with a flexible, water-resistant composite that is suitable for use on a wide variety of surfaces. The invention is suitable not only for coating and smoothing metal or painted surfaces but also for coating and smoothing plastic, plexiglass®, formica®, lexan®, rubber, vinyl, leather, wood, marble, tile, glass, and fiberglass.

The composite contains everything that is necessary for coating a prepared surface. One or more substances—waxes or silicone resins or both—form the surface coating. One or more silicone fluids form a layer on the surface of the composite material and operate as a lubricant. Particles of one or more mild abrasives help to clean and smooth the surface; they also help to establish a lubricating layer of silicone on the surface of the composite material and the foam pad and to distribute the coating onto the surface. The plastic matrix allows the composite material to conform to the surface being cleaned and coated. A soft texture of the composite and a soft texture of the foam pad minimize scratching of the surface. Use of the composite allows application of a surface coating without dissolving or dispersing the coating in VOCs or emulsifying the coating in water.

The foam pad partially or entirely impregnated with the composite may be used alone; the user simply rubs the device across the surface to be coated. The foam pad impregnated with the composite may also be used with water or other liquid to lubricate the surface. Optionally, for best results, the surface should be cleaned before the coating process is begun. A conventional washing solution with a pH between 7 and 9 may advantageously be used.

Applicant's invention may also take the form of a system that comprises the foam pad impregnated with the composite and a rejuvenator fluid to be applied to the composite and the foam pad to renew and maintain its properties of the composite.

Applicant's invention may also be used to coat molds for making plastic products to promote easy removal of the molded products upon completion of the molding process.

Disclosure: Composite

Applicant's device comprises a foam pad partially or entirely impregnated with the composite that in turn comprises, at a minimum, a flexible plastic matrix, a silicone fluid, an abrasive, and a coating. Throughout this disclosure and the claims of this application, "impregnated" refers to the impregnation of the entire foam pad or of any portion thereof. Preferably, one surface of the pad will have about 50 percent of its surface impregnated with the composite as described below.

The matrix is formed of a mixture of one or more non-volatile resin polymers, which may be made by conventional chemical synthesis or purchased from suppliers of industrial chemicals. Examples of suitable matrix materials include: rosin and petroleum-derived resins such as polylimonene, poly-alpha-pinene, poly-beta-pinene, polyethylene, polybutene, and polyterpene; hydrogenated resins; and modified styrene resins. Any suitable combination of these materials may be used.

The matrix is selected so that the composite, examined separately before impregnation into the foam pad, has a wax penetration point measurement from about 60 mm to about 250 mm at 25 degrees Celsius under ASTM Test Method D217-82. Note that all claim limitations directed to the composite refer to the composite when examined alone, prior to impregnation in the foam pad.

The composite comprises a silicone fluid. A silicone fluid of the composite may be any silicone fluid, including organopolysiloxane fluid and alkylaurylsiloxane fluid, or any suitable combination of silicone fluids.

The composite contains mild, inert polishing abrasives, which help create a clean and smooth finish. The abrasives comprise a multiplicity of inert particles selected to avoid damaging the surface being coated. Examples of suitable abrasives include alumina, silica, silicates, silicon carbide, beryllium oxides, clay, calcium carbonate, pumice, earth, calcium-containing metal abrasives or abrasives containing metal oxides. Any combination of suitable abrasives can be used.

The composite also comprises a surface coating, which may comprise any wax substance, including the following: animal waxes such as beeswax or spermaceti; ceramic wax; plant waxes such as carnauba wax or candilla wax; mineral waxes such as ozokerite wax or ceresin wax, Montan wax, paraffin wax, or microcrystalline wax; synthetic waxes such as oxides of paraffin wax or their esters; cane sugar-aliphatic acid ester waxes; polyol ether esters; higher alcohols-higher aliphatic acid waxes; and chlorinated napthalenes. In addition, the surface coating component of the composite may comprise a silicone resin. Any suitable combination of waxes, silicone resins, or waxes and silicone resins may be used.

Advantages Gained by Reduction or Elimination of Undesirable Components from Composite The composite may include VOCs (volatile organic compounds), but preferably it contains as little VOC as possible—only the amount found in the materials used to make the composite. It is preferable to minimize VOCs because VOCs present health and environmental hazards, are heavily regulated by governments, and may require users to employ special protective equipment. The composite may contain non-VOC hydrocarbon solvents, but preferably it does not because non-VOC hydrocarbon solvents may require special equipment or handling because they burn readily and have low flash points.

The composite may also include detergent or soap, but preferably it does not because the presence of detergent or soap may reduce the luster or the protective qualities of the coating formed by use of the invention.

The composite may include some water, particularly as a trace ingredient in some materials used for making the invention. But the composite preferably contains much less water than a water-based emulsion, thus avoiding instability and freezing as described above.

Unlike conventional coating compositions, the composite does not require the use of volatile organic compounds (VOCs). The composite also does not require water or a non-VOC hydrocarbon solvent, and it does not require emulsifiers such as detergent or soap. Because the composite allows coating to be performed with minimal water, detergent, VOCs, non-VOC hydrocarbon solvents, and soap, or with no water, detergent, VOCs, non-VOC hydrocarbon solvents, or soap, the composite provides substantial advantages compared to prior compositions for coating.

Applicant's invention is a significant advance in the field of applying coatings to surfaces; applicant's invention substantially eliminates VOCs, non-VOC hydrocarbon solvents, water, and surfactants—one or more of which is found in all conventional coating compounds. Although applicant's device bears some similarity to Kodate's cleaning tools and other background-art cleaning tools that were described above, applicant's invention is for coating a surface—a purpose not addressed by Kodate. Moreover, Kodate's tool requires the presence of detergent, soap, or non-abrasive globular particles (in addition to the abrasive particles) that applicant's invention does not require. The superficial similarity between applicant's composite and Kodate's tool for cleaning and polishing should not obscure the advance that applicant has made in the art of coating.

To applicant's knowledge, applicant's composite is the first coating composition that allows the user to apply a wax coating without requiring VOCs, non-VOC hydrocarbon solvents, water, or surfactants (beyond trace amounts). To applicant's knowledge, applicant's composite is the first coating composition to include a wax or silicone resin coating and silicone fluid with no requirement to include VOCs, non-VOC hydrocarbon solvents, water, or surfactants (beyond trace amounts). Furthermore, to applicant's knowledge, applicant's composite is the first coating compound to allow application of a wax or silicone resin coating using a soft, flexible plastic composite.

The instant invention provides additional advantages over the devices and systems disclosed in applicant's PCT Application No. PCT/US02/20031. The composite-impregnated foam pad of the instant invention requires less of the composite than typically would be used in the devices and systems disclosed in applicant's PCT Application No. PCT/US02/20031. Reducing the amount of composite means that each device costs less. This can reduce the cost to the user, particularly the cost associated with devices that are inadvertently dropped and become so dirty that they are no longer usable. The reduced cost can also allow each device to be discarded after a certain number of uses.

Disclosure: Rejuvenator Fluid

Optionally, applicant's invention may take the form of a system comprising the foam pad impregnated with the composite and a rejuvenator fluid for maintaining the properties of the composite. One embodiment of the rejuvenator fluid is a solution comprising silicone and wax. When applied to the foam pad impregnated with a composite containing silicone and wax, the rejuvenator fluid maintains and renews the properties of the composite by replacing wax and silicone fluid that are consumed in coating the surface. Preferably the silicone fluid is a water solution containing an emulsifier in addition to the wax and the silicone fluid. Suitable emulsifiers include the amine acetates—preferably acetic acid salts of the n-alkyl amines.

The rejuvenator fluid may be applied to the foam pad impregnated with the composite by spraying, dipping, or otherwise. The rejuvenator fluid applied to and contained in the foam thus continuously renews the properties of the composite, extending its life and improving its performance.

The background art includes the use of lubricating fluids and absorbent pads (including those with elastic for attachment to a user's hand) along with pliable cleaning materials. But the background-art lubricant fluids are not used in a coating process and are not used to restore coating or other properties of a composite.

Both the foregoing general description and the following detailed description are exemplary and explanatory only and do not restrict the invention as claimed.

MODES FOR CARRYING OUT THE INVENTION

Figure 1:
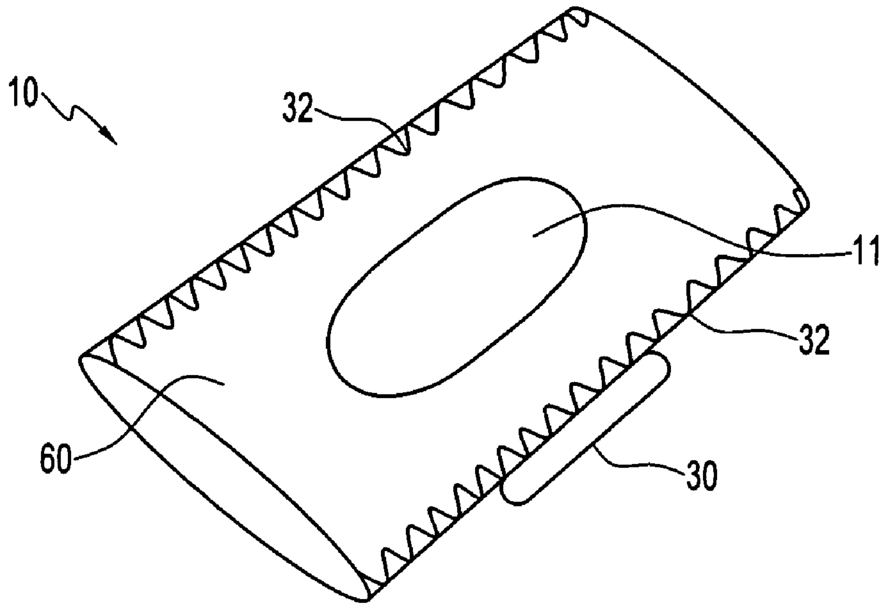
FIG. 1 is a bottom perspective view of an embodiment of a device according to the invention.

The device according to the present invention comprises a foam pad impregnated with a composite with an ASTM: D217-82 cone penetration measurement from about 60 mm to about 250 mm at 25 degrees Celsius (77 degrees Fahrenheit). The foam pad may be any sufficiently durable and flexible foam material, cut to a convenient size for handling by the user. Examples of suitable foam materials include cellulose, silicone, and polyester. An essentially oblong pad about 16 cm by 11 cm by 1 cm has been found effective. The composite comprises a flexible plastic matrix; one or more silicone fluids; one or more surface coatings; and a multiplicity of one or more types of abrasive particles. The invention may take the form of a system comprising the foam pad impregnated with the composite and further comprising rejuvenator fluid.

In the preferred embodiment, the device of the invention comprises a foam pad impregnated with the composite of the invention. The foam pad is shaped so that it is convenient for the user to handle it and rub it across a surface to be coated. The foam pad may have an attached elastic band for fastening around the user's hand or wrist; the elastic band helps to prevent the user from dropping the device on the ground. Dropping the device may cause the pad and the impregnated composite to absorb dirt particles that may damage the surface. Thus preventing the user from dropping the foam pad increases the average life of the pads and reduces costs for the user.

One composite according to the invention comprises a matrix of polybutene, polyterpene, and polyethylene; a silicone fluid; a wax; and silica sand and aluminum silicate.

A preferred embodiment of the rejuvenator fluid contains about 0.3% wax, 0.5% polydimethylsiloxane, 0.5% acetic acid salts of the n-alkyl amines. The remainder of the rejuvenator primarily comprises water, along with small amounts of dye, fragrance, and preservative.

One embodiment of the composite of the invention can be prepared by mixing the following ("parts" being defined as parts by mass): (a) about 4 parts of any combination of waxes and silicone resins; (b) about 36 parts of any combination of silicone fluids; (c) about 32 parts polybutene; (d) about 3 parts polyterpene; and (e) about 3 parts polyethylene plastic. After these components have been blended, the mixture may be added to about 100 parts of any combination of inert particles, but preferably to about one part silica sand combined with about 99 parts aluminum silicate. The total weight of the finished composition is about 178.25 parts.

The composite is impregnated into the foam pad by heating the composite to a flowable temperature of about 100 degrees Celsius. A mold plate, which is a solid plate having a thickness of about 1⁄16 inches or greater, has an opening matching the shape of the desired impregnated portion of the foam pad. The mold plate is placed on the foam pad, and the hot composite is introduced onto the portion of the foam pad that is visible through mold opening. Then a blade-type device such as a putty knife or squeegee is used to push the composite across and into the foam pad. For convenience, the elastic band may be sewn onto the foam pad before the composite is impregnated into foam pad.

In the drawings, FIG. 1 shows a bottom perspective view of the device 10, a generally oblong foam pad 60 impregnated with the composite of the invention. Impregnated surface area 11 is the surface of the device 10 where the composite has been absorbed by the foam pad. Stitching rows 32 secure the elastic band 30 to the foam pad 60.

Figure 2:
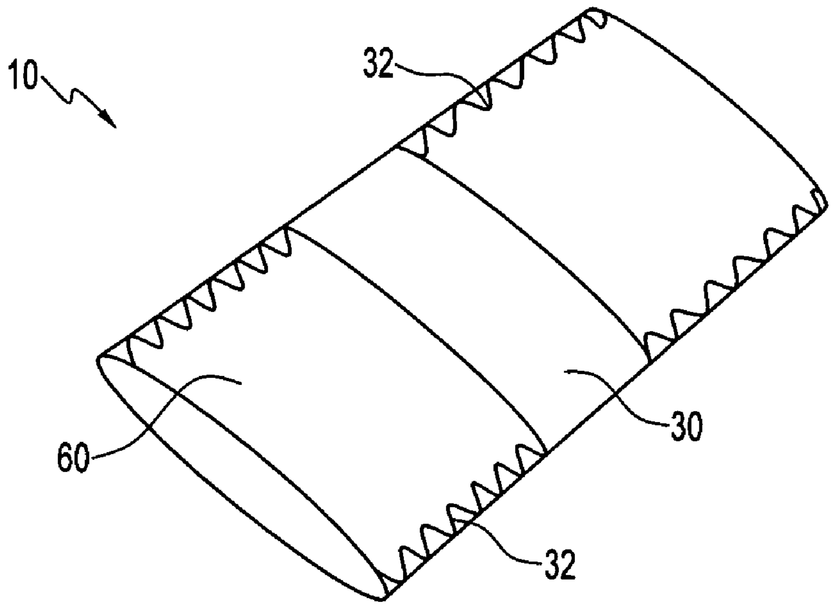
FIG. 2 is a top perspective view of an embodiment of a device according to the invention.

In the drawings, FIG. 2 shows a top perspective view of the device 10, a generally oblong foam pad 60 impregnated with the composite of the invention. Stitching rows 32 secure the elastic band 30 to the foam pad 60.

Figure 3:
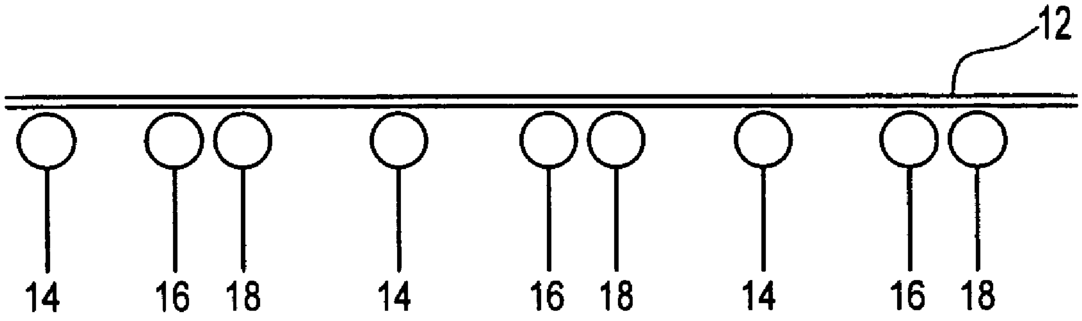
FIG. 3 is a schematic, greatly magnified, view of a portion of the surface of an embodiment of a portion of a composite material according to the invention.

FIG. 3 shows a greatly magnified segment of surface 12 of the composite, the surface 12 having a thin layer of a mixture of wax 14, abrasive 16, and silicone 18. As illustrated in FIG. 2, silicone 18 and the abrasive 16 tend to be attracted to each other and tend to repel wax 14. This interaction helps to deposit wax 14 on a surface 50, shown in FIG. 4, that is treated with the device 10.

Figure 4:
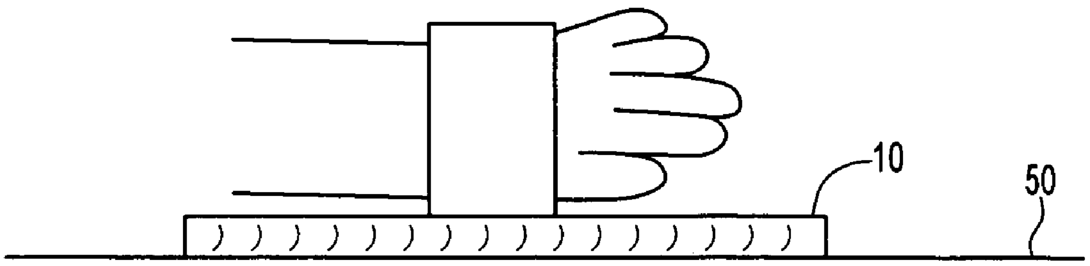
FIG. 4 is a side view of an embodiment of a device according to the invention depicted in a working position in contact with a surface.

FIG. 4 shows the device 10 in a working position in contact with a surface 50 that is to be coated.

Figure 5:
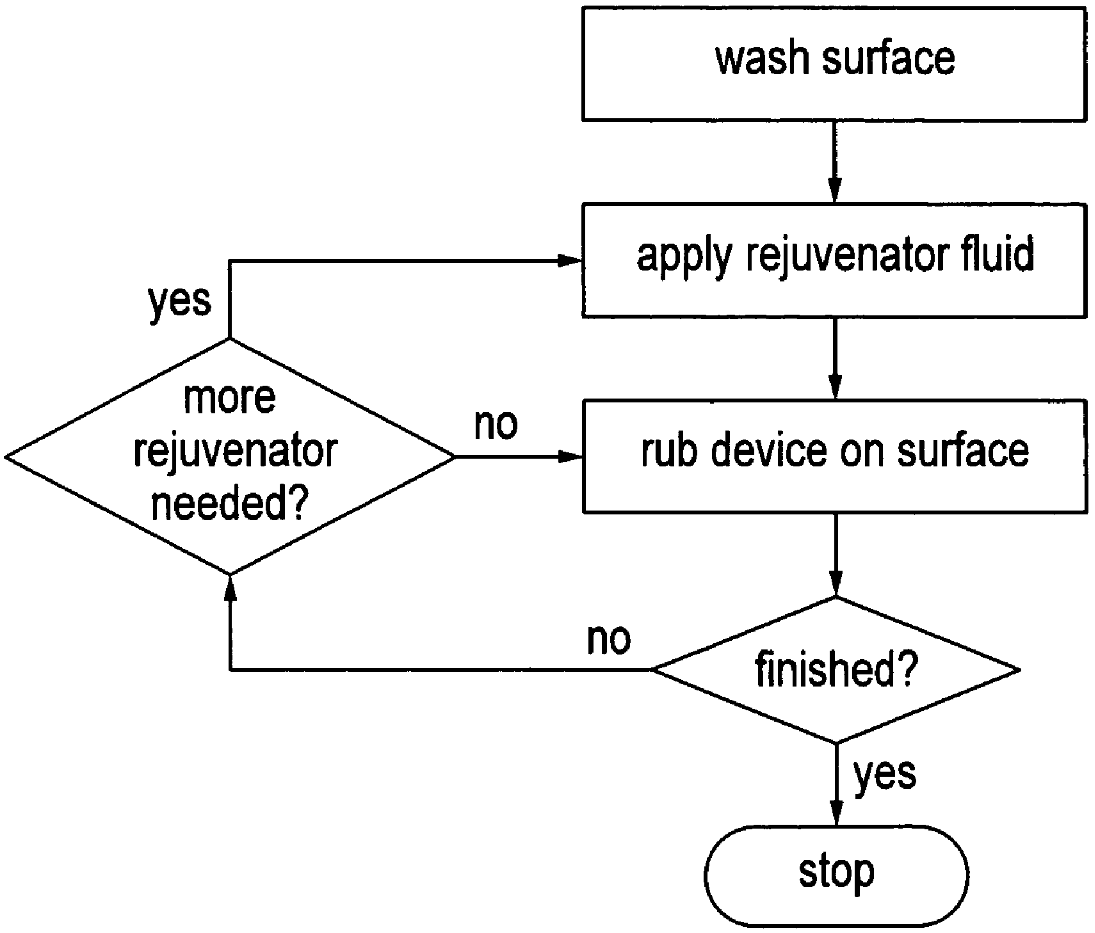
FIG. 5 is a flow chart showing the steps in a process that is an embodiment of a method according to the invention.

FIG. 5 shows steps that may be employed in using an embodiment of the device 10 along with rejuvenator fluid, which may be applied to the device 10 by dipping or spraying.

Figure 6:
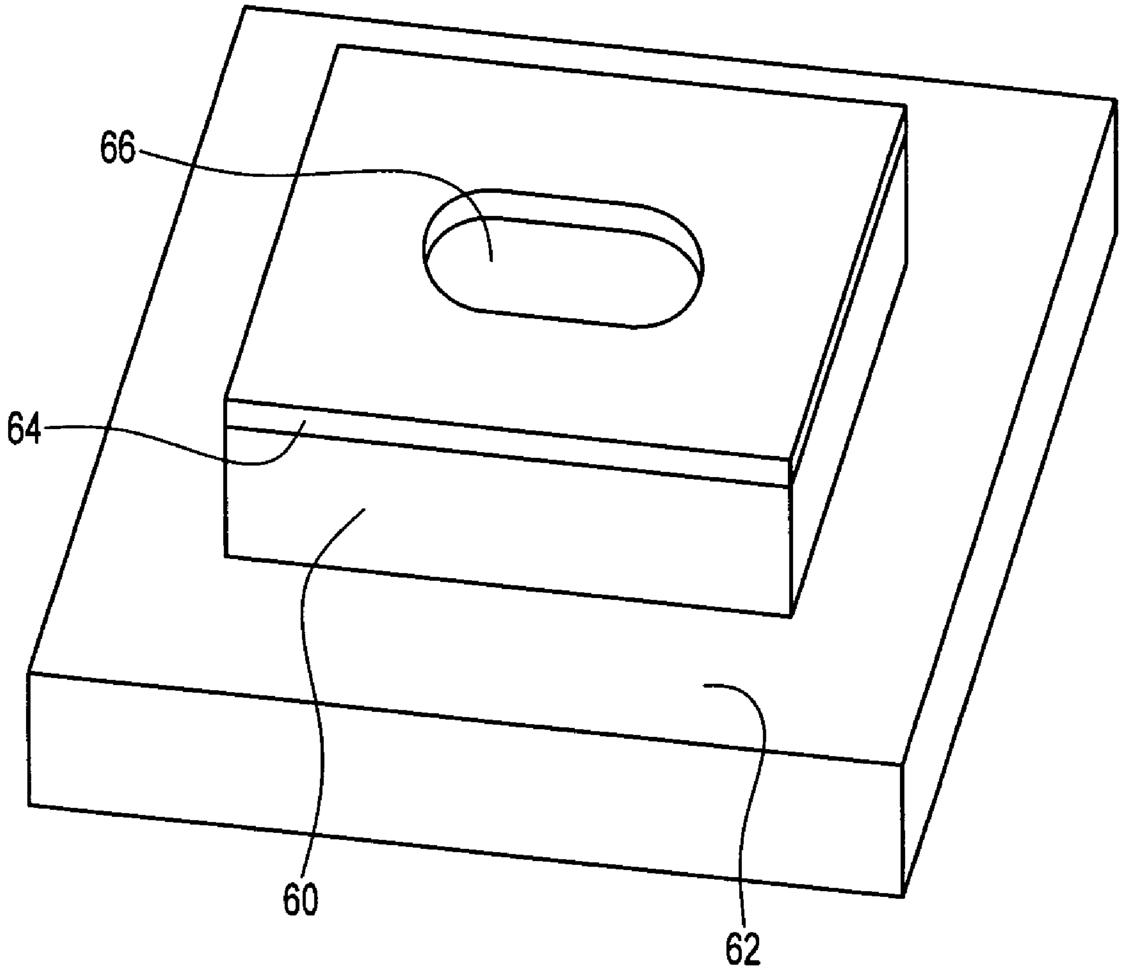
FIG. 6 is a perspective view of a step in making of a device according to the invention.

FIG. 6 shows a step in making of a device 10 according to the invention. In the step depicted, foam pad 60 rests upon work surface 62. Mold plate 64 rests on foam pad 60. A portion of the foam pad 60 that is visible through mold opening 66.

I claim:

1. A device for applying a protective coating to a surface, said device comprising:

a foam pad impregnated with a composite, wherein said composite comprises:

a matrix comprising at least one polymer resin selected from the group consisting of hydrocarbon, polybutene, silicone, and polyethylene;

at least one silicone fluid;

a surface coating comprising at least one material selected from the group consisting of wax and silicone resin; and a multiplicity of inert particles dispersed within the matrix;

wherein the composite has a wax penetration point measurement from about 60 mm to about 250 mm at 25 degrees Celsius under ASTM Test Method D217.

2. A device according to claim 1, wherein the inert particles comprise at least one material selected from the group consisting of aluminum silicate, diatomaceous earth, and aluminum oxide.

3. A device according to claim 1, wherein the inert particles comprise at least two materials selected from the group consisting of aluminum silicate, diatomaceous earth, and aluminum oxide.

4. A device according to claim 1, wherein the composite optionally contains volatile organic compounds in an amount of less than about 5 percent by weight of the composite; and optionally contains non-volatile hydrocarbon solvents in an amount of less than about 5 percent by weight of the composite.

5. A device according to claim 1, wherein the composite optionally contains soaps and detergents, and the sum of the percentages by weight of all soaps and detergents contained in the composite is less than about 10 percent of the total weight of the composite material.

6. A device according to claim 1, wherein the weight of the inert particles is between about 40 percent and about 80 percent of the total weight of the composite material.

7. A device according to claim 1, wherein the silicone fluid comprises at least one fluid selected from the group consisting of polydimethylsiloxane fluid, dimethyl siloxane polymer fluid, alkymethyl polysiloxane fluid, dimethylsiloxane fluid, and amine functional silicone fluid.

8. A device according to claim 1, wherein the composite optionally contains volatile organic compounds in an amount of less than about 1 percent by weight of the composite.

9. A device according to claim 1, wherein the device is adapted so that it has formed on its surface a layer of silicone fluid.

10. A device according to claim 9, wherein the layer of silicone fluid, which forms on the surface of the device, has a multiplicity of inert particles distributed in the layer of silicone fluid.

11. A device according to claim 1, wherein the composite maintains its flexibility upon exposure to the atmosphere.

12. A device according to claim 1, wherein the composite maintains its lubricant content upon exposure to the atmosphere.

13. A device according to claim 1, wherein the device is adapted to conform to the shape of the surface upon which the device is rubbed.

14. A device according to claim 1, wherein the inert particles are selected to minimize scratching of the surface upon which the device is rubbed.

15. A device according to claim 1, wherein the device is adapted so that the device, when rubbed upon the surface, deposits a durable, water-resistant coating thereupon.

16. A device according to claim 1, wherein the composite optionally comprises emulsifiers, and emulsifiers constitute less than about 10 percent by weight of the composite.

17. A device according to claim 1, wherein the composite optionally comprises water, and water constitutes less than about 5 percent of the composite.

18. A method for applying a protective coating to a surface, comprising:

using the device claimed in claim 17.

19. A method according to claim 18, wherein the composite optionally contains volatile compounds in an amount of less than 1 percent by weight of the composite.

20. A method for applying a protective coating to a surface, comprising:

rubbing the surface with the device claimed in claim 1.

21. A device according to claim 1, wherein the matrix comprises polybutene, polyterpene, and polyethylene.

22. A device according to claim 1, wherein the inert particles have diameters of about 0.1 to about 3 microns or diameters greater than 50 microns, or both.

23. A device according to claim 1, wherein the composite is water-resistant.

24. A system for applying a protective coating to a surface, said system comprising: (1) a device comprising a foam pad impregnated with a composite for applying a protective coating to the surface, and (2) a rejuvenator fluid comprising a silicone and a wax; wherein said composite comprises:

(A) a matrix comprising at least one polymer resin chosen from the following group: hydrocarbon, polybutene, silicone, polyethylene;

(B) at least one silicone fluid;

(C) a surface coating comprising at least one material selected from the group consisting of wax and silicone resin; and (D) a multiplicity of inert particles dispersed within the matrix;

wherein the composite has a wax penetration point measurement from about 60 mm to about 250 mm at 25 degrees Celsius under ASTM Test Method D217; and wherein the device is adapted to be rubbed upon the surface to coat the surface with the coating.

25. A system according to claim 24, wherein the rejuvenator fluid further comprises an emulsifier.

26. A system according to claim 25, wherein the emulsifier component in the rejuvenator fluid comprises an acetic acid salt of the n-alkyl amines.

27. A system according to claim 24, wherein at most 99 percent of the volume of the foam pad is impregnated with the composite.

28. A system according to claim 24, wherein at most 99 percent of the surface of the foam pad is impregnated with the composite.

29. A system according to claim 24, wherein at most 50 percent of the volume of the foam pad is impregnated with the composite.

30. A system according to claim 24, wherein at most 50 percent of the surface of the foam pad is impregnated with the composite.

31. A system according to claim 24, 25, or 26, wherein the composite optionally contains volatile organic compounds in an amount of less than about 1 percent by weight of the composite.

32. A system according to claim 24, 25, or 26, wherein the weight of the inert particles is between about 40 percent and about 80 percent of the total weight of the composite material.

33. A system according to claim 24, 25, or 26, wherein the silicone fluid is selected from the group consisting of polydimethylsiloxane fluid, dimethyl siloxane polymer fluid, alkymethyl polysiloxane fluid, dimethylsiloxane fluid, and amine functional silicone fluid.

34. A system according to claim 24, 25, or 26, wherein the composite is water-resistant.

35. A system according to claim 24, 25, or 26, wherein the device has formed a layer of silicone fluid on its surface.

36. A system according to claim 24, 25, or 26, wherein the device has formed a layer of silicone fluid on its surface and wherein the layer of silicone fluid, which forms the exterior surface of the device, has a multiplicity of the inert particles distributed in the layer of silicone fluid.

37. A system according to claim 24, 25, or 26, wherein the composite maintains its flexibility upon exposure to the atmosphere.

38. A system according claim 24, 25, or 26, wherein the composite maintains its lubricant content upon exposure to the atmosphere.

39. A system according to claim 24, 25, or 26, wherein the device conforms to the shape of a surface upon which the device is rubbed.

40. A system according to claim 24, 25, or 26, wherein the inert particles are selected to minimize scratching of the surface upon which the device is rubbed.

41. A system according to claim 24, 25, or 26, wherein the device deposits a durable, water-resistant coating upon the surface on which it is rubbed.

42. A system according to claim 24, 25, or 26, wherein the composite optionally comprises emulsifiers, and emulsifiers constitute less than about 10 percent by weight of the composite.

43. A system according to claim 24, 25, or 26, wherein the inert particles have diameters of from 0.1 to 3 microns, or diameters greater than 50 microns, or both.

44. A device for application of a mold-release coating to a mold, said device comprising:

a foam pad impregnated with a composite, wherein said composite comprises:

(A) a matrix comprising at least one polymer resin selected from the group consisting of hydrocarbon, polybutene, silicone, and polyethylene;

(B) at least one silicone fluid;

(C) a surface coating comprising at least one material selected from the group consisting of wax and silicone resin; and (D) a multiplicity of inert particles dispersed within the matrix;

wherein the composite has a wax penetration point measurement from about 60 mm to about 250 mm at 25 degrees Celsius under ASTM Test Method D217; and wherein the device is adapted so that the device, when rubbed upon a surface, leaves a mold-release coating on the surface when rubbed thereon.

45. A device for applying a protective coating to a surface, said device comprising: a foam pad impregnated with a composite material, wherein said composite material consists essentially of:

(A) about 32 parts by weight of polybutene;

(B) about 3 parts by weight of polyterpene;

(C) about 3 parts by weight of polyethylene plastic;

(D) about 4 total parts by weight of plastic or silicone resin or both; and (E) about 100 total parts by weight of inert particles.

46. A device according to claim 45, wherein the inert particles consist essentially of 1 part silica sand and 99 parts aluminum silicate.

* * * * *